United States Patent Office 2,988,196
Patented June 13, 1961

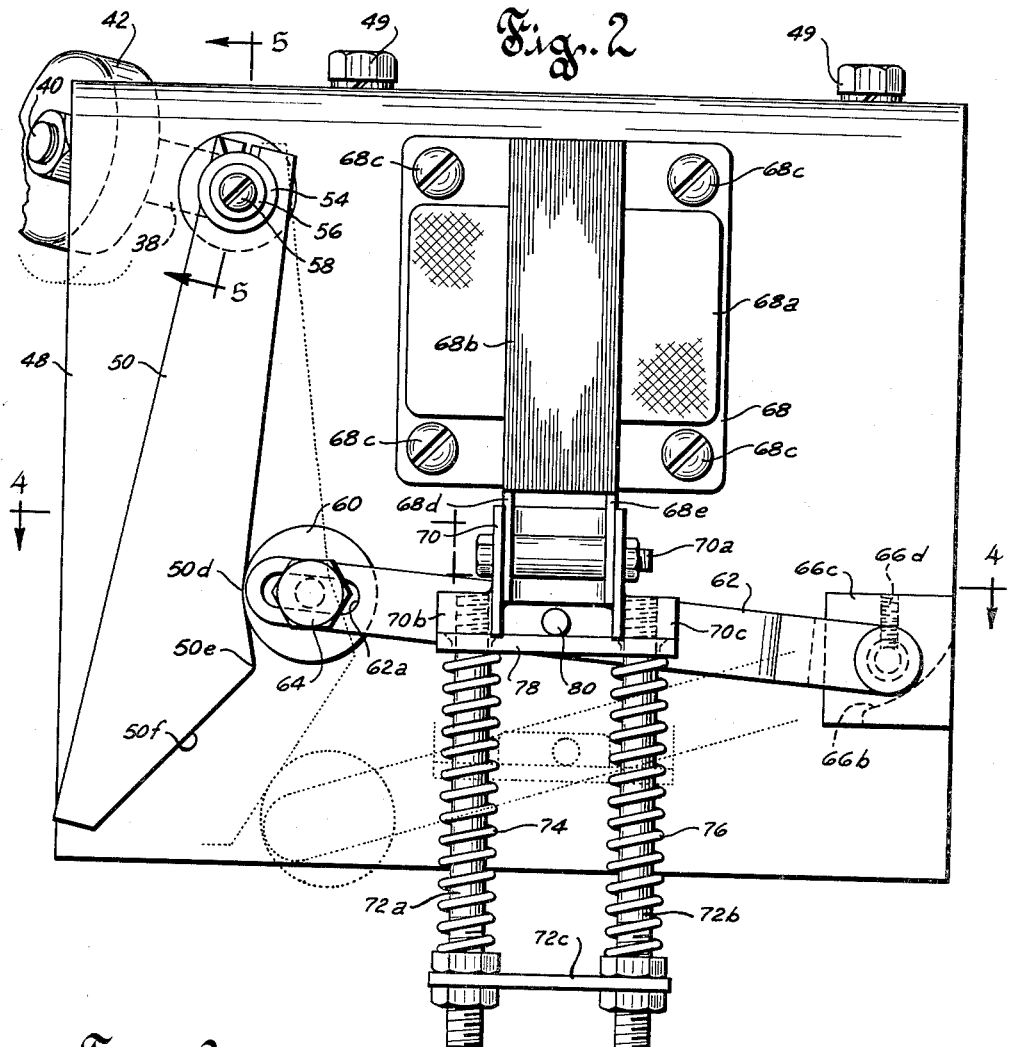
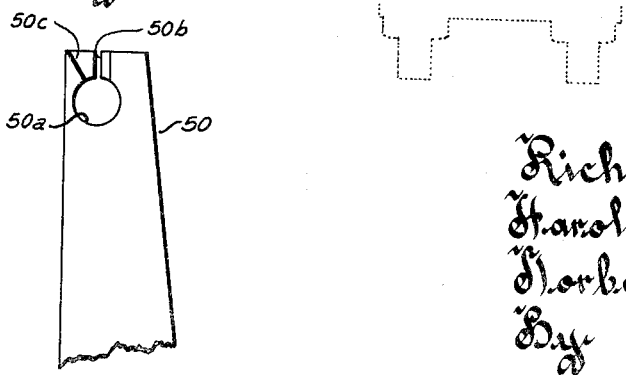

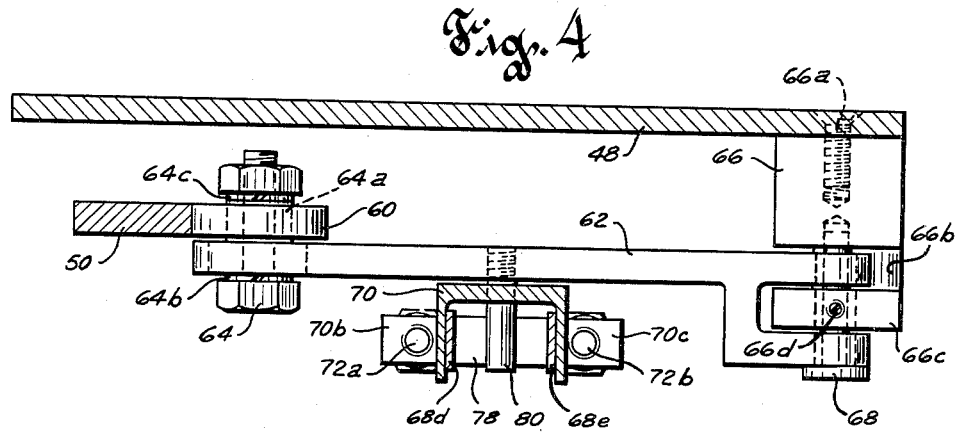
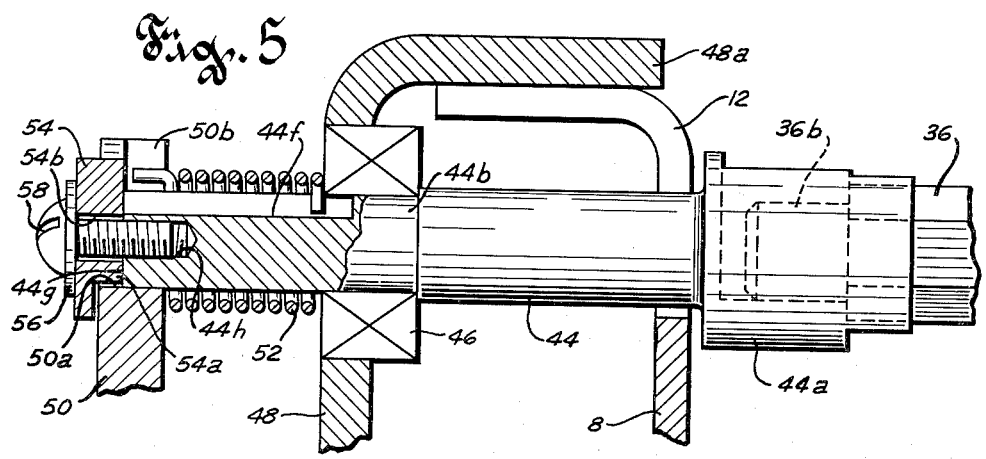
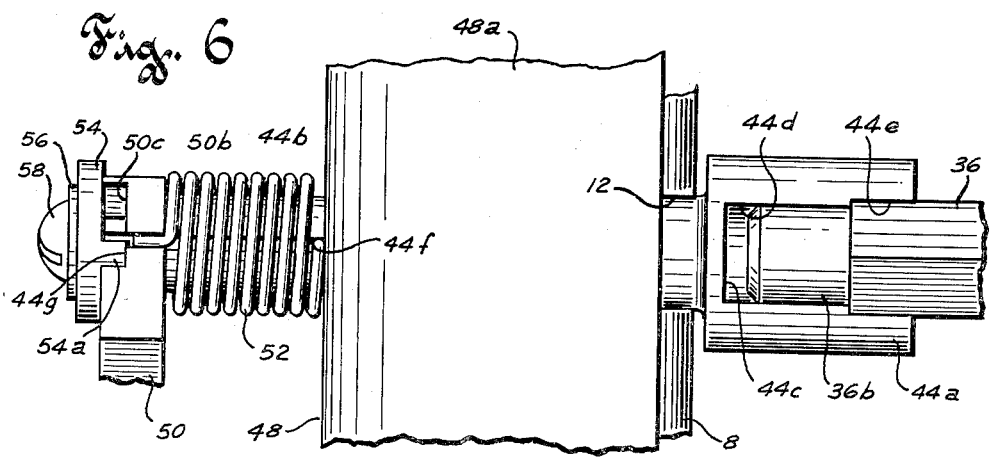

2,988,196
DIVERTER AND OPERATING MECHANISM
FOR AN ARTICLE CONVEYOR
Richard J. Byrnes, West Allis, and Harold S. Montgomery and Norbert Sadowski, Milwaukee, Wis., assignors to Cutler-Hammer, Inc., Milwaukee, Wis., a corporation of Delaware
Filed Mar. 30, 1960, Ser. No. 18,530
14 Claims. (Cl. 198—20)

This invention relates to article conveyors and more particularly to article diverters and operating mechanisms therefor.

While not limited thereto, the invention is especially applicable to roller conveyors of the belt driven type or the like for the thing being conveyed such as an article or article carrier from a main conveyor to a branch conveyor which is at a substantially right angle to or parallel with the main conveyor and which may be on either side of the latter.

Richard J. Byrnes' copending application Serial No. 861,039, filed December 21, 1959, shows a diverter mechanism of the skate wheel type having a supporting rod rotatably mounted transversely of a main conveyor and a row of diverter wheels secured to brackets along one side of the rod with each wheel being at a 45 degree angle toward a branch conveyor. An electromagnet is operative to rotate the supporting rod to lift the wheels into their diverting position. The present invention is an improvement on the invention disclosed in this copending application.

An object of the invention is to provide an improved diverter mechanism for a conveyor.

A more specific object of the invention is to provide improved diverter operating mechanisms which are simple and economical in construction and efficient and reliable in operation.

Another specific object of the invention is to provide an improved diverter mechanism which is readily reversible to divert articles to either the right or left side of the conveyor.

Another specific object of the invention is to provide an improved operating mechanism for a diverter device of the skate wheel type.

A further specific object of the invention is to provide an improved electrical operating mechanism for a diverter device of the skate wheel type, which mechanism is operable to move the diverter device from the lower non-diverting position to a raised diverting position.

In accordance with the invention, there is provided an electromagnetically powered operating mechanism for an improved diverting device for a conveyor, the diverting device being of the type having a single row of skate wheels or the like mounted on a supporting rod arranged transversely of a conveyor, these wheels being at a predetermined angle relative to the primary axis of a conveyor and being operatble from a lower non-diverting position to a raised diverting position wherein they engage an article and turn and divert the same off the conveyor. The diverting wheel unit is readily reversible to divert articles to either the right or left side of a conveyor. The diverter device is coupled through an arm type cam and roller and actuator lever to an electromagnetic operator whereby energization of the electromagnet effects raising of the wheels. The cam is shaped so and cooperates with the roller such that the weight of an article on the wheels maintains the diverter device in its diverting position if the electromagnet is deenergized. The armature is resiliently connected to the actuator lever in order to permit sealing of the electromagnet if energized while an article is on the diverter wheels. The cam is coupled to the diverter device through a spring-biased lost motion connection to permit depression of the wheels to maintain the articles in driven engagement with the adjacent conveyor rollers while being diverted.

The above mentioned and other objects and advantages of the invention will become more apparent and the invention itself will be best understood by referring to the following description of an embodiment thereof taken in conjunction with the accompanying drawings wherein:

FIG. 2 is an enlarged end view of the diverter device and its operating mechanism of FIG. 1;

FIG. 3 is a fragmentary view of the upper end of the cam of FIG. 2;

FIG. 4 is a cross-sectional view taken along lines 4—4 of FIG. 2;

FIG. 5 is a cross-sectional view taken along lines 5—5 of FIG. 2; and

FIG. 6 is a fragmentary top view of that portion of the operating mechanism shown in cross-section in FIG. 5.

Figure 1:
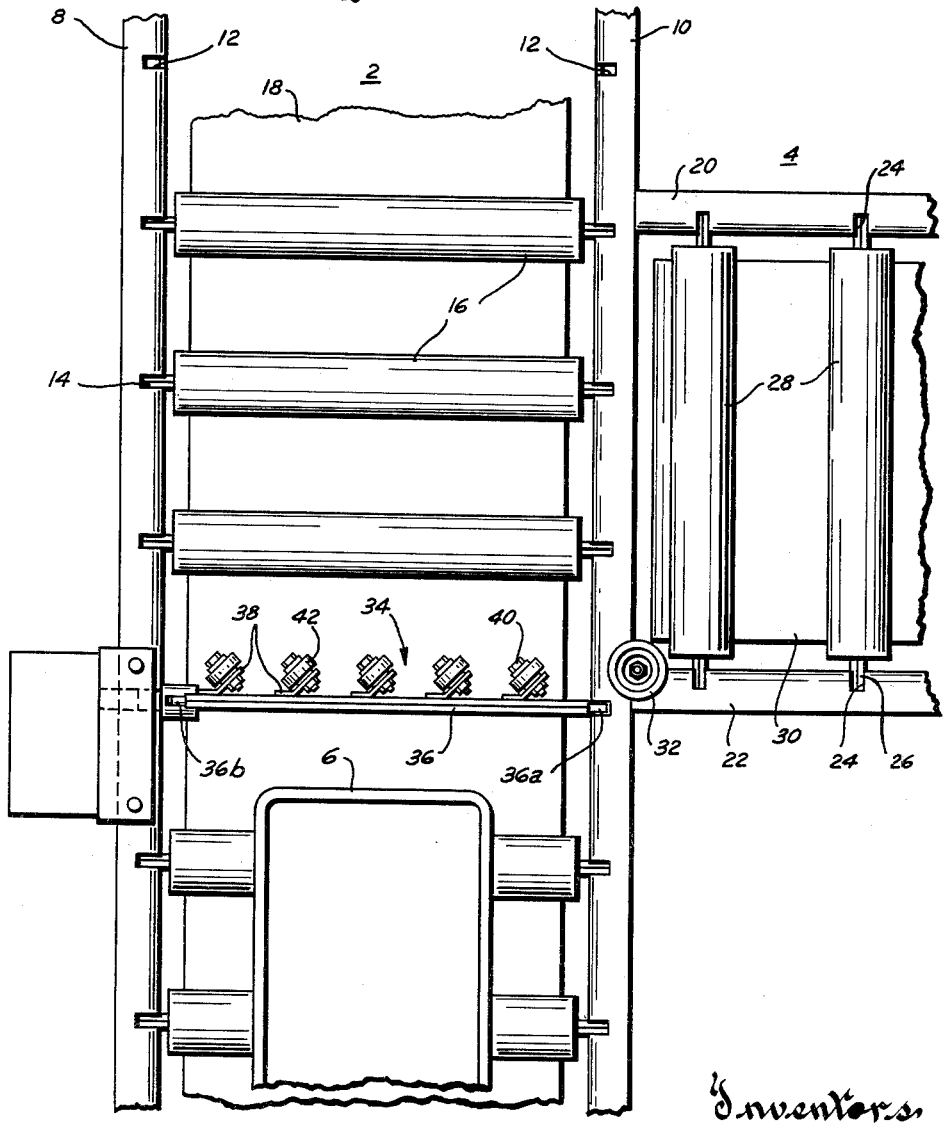
FIGURE 1 is a top view of an article conveyor and diverter device and an operating mechanism for the latter constructed in accordance with the invention.

Referring to FIG. 1, there is shown an article conveyor system comprising a main conveyor 2 and a branch conveyor 4, the latter extending from the right-hand side of the main conveyor at a right angle. The conveyors are of the well known belt driven roller type and are adapted for conveying an article or article carrier such as, for example, a tray 6 or the like. Main conveyor 2 is provided with a pair of generally shallow U-shaped support or frame members 8 and 10 arranged on edge with the bottoms of the U-shaped members arranged in opposed relation to form side rails for the conveyor. The upper inner corners of frame members 8 and 10 are provided with equally spaced open top slots or notches 12, each notch on member 8 being in lateral alinement with a corresponding notch on member 10 and each such pair of alined notches being adapted to accommodate and securely support the ends of an axle 14 on a conveyor roller 16. The ends of axle 14 are of hexagonal cross-section or may be provided with suitable flat or partially flat sides to be held against rotation in their associated notches 12 whereas roller 16 is mounted for free rotation on the axle. It will be apparent that rollers 16 are held in their respective positions by gravity and that each such roller may be freely lifted from its notches if it is desired to remove the same. Rollers 16 are frictionally driven by an endless motor driven belt 18. In conveyors of this type, a plurality of idler rollers, not shown, are mounted below belt 18 and these idler rollers are staggered relative to rollers 16 to bias belt 18 into frictional engagement with rollers 16.

Similarly, branch conveyor 4 is provided with a pair of like spaced frame members 20 and 22 each having notches 24 for receiving the ends of axles 26 of a plurality of spaced rollers 28. These rollers are frictionally driven by an endless motor driven belt 30 and a plurality of freely rotatable idler rollers, not shown, are mounted in a suitable manner below belt 30 for biasing the belt into frictional engagement with rollers 28. A freely rotatable guide wheel 32 is journaled on the end of frame member 22 at the entry side of branch conveyor 4 for guiding tray 6 as it turns from the main conveyor to the branch conveyor.

While branch conveyor 4 has been illustrated as being at a right angle to main conveyor 2 it will be apparent that it could as well be in adjacent parallel arrangement with the main conveyor or at any desired angle between such parallel and right angle positions. Also, branch conveyor 4 could be arranged in any of these positions on the left-hand side of main conveyor 2.

Main conveyor 2 is provided with a diverter device 34 immediately adjacent the entry side of the branch conveyor as shown in Fig. 1. This diverter device is mounted in place of one conveyor roller in the notches 12 thereof. However, it is apparent that diverter device 34 could as well be mounted between a pair of adjacent rollers in suitable notches provided therefor. As shown in FIGS. 1 and 2, diverter device 34 is provided with an elongated supporting rod 36 of hexagonal cross-section along its length and having a rounded right-hand end portion 36a to afford free rotation of such rod in notch 12 of frame member 10. The left-hand end of rod 36 is also provided with a rounded portion 36b to provide for reversal of diverter device 34 on the main conveyor in order to divert articles to the left-hand side of the main conveyor rather than to the right-hand side thereof. The left-hand end of rod 36 is supported by a structure more fully hereinafter described. A plurality of angular diverting wheel supporting brackets 38 are rigidly secured as by welding at one end thereof in spaced apart relation, preferably equally spaced apart relation, along a vertical side of rod 36. The other end of each such bracket 38 diverges from rod 36 at an acute angle of substantially 45 degrees to the axis of the latter. The diverging portion of each bracket 38 is provided adjacent the upper edge thereof, as more clearly shown in Richard J. Byrnes copending application Serial No. 861,039, filed December 21, 1959, with a hole accommodating a diverting wheel axle 40. Axle 40 extends through wheel 42 centrally thereof and through the hole in bracket 38 and is secured to the latter and spaced therefrom by a washer or the like to afford free rotation of the wheel on its axle.

As more clearly shown in FIGS. 5 and 6, a supporting, connecting and actuating link such as a shaft 44 is mounted on conveyor frame member 8. To this end, notch 12 in frame member 8 has been extended all the way through the upper flange of the latter forming an open top slot or notch to accommodate shaft 44 and to permit downward movement of the latter into its position as shown in FIG. 5. Shaft 44 is provided with an enlarged right-hand end portion 44a extending inwardly of frame member 8 and a reduced round left-hand end portion 44b, the latter being journaled by a bearing 46 or the like into a vertically arranged mounting plate 48 which supports not only shaft 44 but also the operating mechanism shown in FIGS. 2 and 4. To this end, mounting plate 48 is provided with an upper flange 48a overlying and resting on and being secured to the upper flange of frame member 8 by a pair of bolts 49 or the like. Bearing 46 is positioned in a hole 48b in mounting plate 48, surrounds reduced end portion 44b of shaft 44 and is confined against the shoulder between reduced end portion 44b and the mid-portion of shaft 44 of larger cross-section. Reduced end portion 44b of shaft 44 extends outwardly through bearing 46 and beyond mounting plate 48. Enlarged end portion 44a of shaft 44 is provided with an open top horizontally stepped slot 44c for accommodating the left-hand rounded end portion 36b and a section of the hexagonal portion of rod 36. The reduced portion 44d of slot 44c extends downwardly part way into enlarged end portion 44a whereas the enlarged portion 44e of slot 44c extends downwardly all the way through enlarged end portion 44a. As seen in FIGS. 5 and 6, the bottom of reduced portion 44d of the slot supports rod 36 at its rounded end portion 36b. The enlarged portion 44e of the slot which has straight vertical sides engages the opposite flat sides of the hexagonal section of rod 36 to prevent rotation of rod 36 relative to shaft 44. This structure facilitates the manufacture of the rigid and readily disconnectable coupling or joint between rod 36 and shaft 44. As will be apparent, reduced portion 44d of slot 44c merely supports rod 36 and, therefore, this portion of the slot need not have a configuration complementary to the rounded end portion of rod 36. Also, enlarged portion 44e of slot 44c functions to prevent relative rotation between the shaft and rod and, therefore, this portion of the slot can be machined all the way through the enlarged end portion 44a of shaft 44. Moreover, this structure avoids the need for close tolerance construction.

An elongated arm type cam member 50 is suspended from the extreme end of the outwardly extending reduced left-hand end portion of shaft 44. As more clearly shown in FIGS. 3, 5 and 6, cam member 50 is provided at its upper end with a transverse round hole 50a for receiving the reduced end portion of shaft 44. A narrow slot 50b extends between hole 50a and the upper end of cam member 50 for receiving and rigidly holding one end of a helical torsion spring 52 which surrounds reduced end portion 44b of shaft 44 between cam member 50 and bearing 46. The other end of spring 52 is securely held in a longitudinal groove 44f extending along end portion 44b of shaft 44. The extreme end portion of reduced end portion 44b of shaft 44 is provided with a transverse off center groove 44g (FIGS. 5 and 6) for accommodating a complementary ridge 54a formed integrally with a washer-like clamping member 54. Member 54 is rigidly secured to shaft 44 by a washer 56 and screw 58 the latter extending through a central hole 54b in clamping member 54 and into threaded engagement with an axle hole 44h in the end of shaft 44. As more clearly shown in FIGS. 5 and 6, clamping member 54 retains cam 50 on shaft 44, cam 50 being biased against clamping member 54 by the compressive stress of helical torsion spring 52. Spring 52 by virtue of the torsion stress therein resiliently biases cam 50 in the counterclockwise direction relative to shaft 44 as seen in FIG. 2. Cam 50 is rotatable on the round reduced end portion 44b of shaft 44 but is restricted in its rotation by ridge 54a by clamping member 54. To this end, and as shown in FIGS. 3 and 6, the upper end of cam member 50 is provided on the outer surface thereof with a relatively wider slot 50c overlying slot 50b for receiving ridge 54a of clamping member 54 with a lost motion connection. As shown in FIG. 3, the right-hand side of slot 50c is vertical and normally engages ridge 54a of the clamping member as shown in FIG. 6 to restrict the rotation of cam 50 in the counterclockwise direction under the bias of spring 52. The left-hand side of slot 50c inclines outwardly at a predetermined angle and forms a stop against ridge 54a when cam member 50 is rotated relative to shaft 44 this restricted amount in the clockwise direction against the bias of spring 52. This limited rotation of cam 50 relative to shaft 44 or vice versa against the resiliency of spring 52 is provided to permit depression of wheels 42 to maintain an article in driven engagement with the adjacent conveyor rollers when such article is being diverted.

As shown in FIG. 2, cam 50 is of generally elongated, flat form and has a straight left edge and straight upper and lower ends. The right-hand edge of cam 50 diverges from its upper end at a very small angle relative to the left-hand edge thereof a predetermined distance to a discontinuity 50d whereat such divergence increases abruptly to a greater angle a predetermined shorter distance to an apex 50e. A substantially straight cam surface 50f extends from apex 50e along such right-hand edge to the lower end of cam member 50, this straight cam surface 50f being at a reentrant, obtuse angle relative to the surface between discontinuity 50d and apex 50e. Cam surface 50f is provided for cooperating with a roller 60 which rotates cam 50 in the clockwise direction. The depression or discontinuity 50d in the cam surface is provided for maintaining roller 60 therein and in the position shown in solid lines in FIG 2 following deenergization of the electromagnetic operator until an article has passed over diverter wheels 42. As shown in FIGS. 2 and 4, roller 60 is mounted onto the left-hand end of an elongated pivotal lever 62 so as to be freely rotatable thereon. To afford adjustment of roller 60 longitudinally of lever 62, the latter is provided with an elongated aperture 62a at its left-hand end. A bolt 64 or the like extends through aperture 62a and through the central hole in roller 60 and a nut is threadedly secured to the end of the bolt to attach roller 60 to lever 62. To afford free rotation of roller 60 relative to lever 62, that portion of bolt 64 which extends through roller 60 is surrounded by a bushing 64a slightly longer than the axial width of roller 60 and having a diameter greater than the width of slot 62a and this bushing is rigidly clamped between lever 62 and the nut. A pair of locking washers are provided, one washer 64b being between the head of bolt 64 and lever 62 for preventing rotation of the bolt relative to the lever and another washer 64c being between bushing 64a and the nut for preventing rotation of the latter relative to the belt. As will be apparent, roller 60 is freely rotatable on bushing 64a and is confined between lever 62 and washer 64c.

The right-hand end of lever 62 is bifurcated to provide a pivotal connection to a projection 66 rigidly secured to mounting plate 48 by one or more screws 66a or the like. Projection 66 is provided with a cutout portion 66b spaced from the unsecured end thereof to provide an upstanding portion 66c positioned between the bifurcated end portions of lever 62. A suitable pin 68 or the like extends through holes in the bifurcated end portions of lever 62 and through a corresponding alined hole in upstanding portion 66c and is immovably secured to the latter by a set screw 66d or the like thereby to pivotally support lever 62 on projection 66. The bifurcated end portion of lever 62 confines the movement of the lever in a vertical plane.

An electromagnet 68 having a solenoid 68a and a magnetic core 68b is rigidly secured as by screws 68c or the like to mounting panel 48. Electromagnet 68 is provided with a magnetic armature or plunger, not shown, accommodated within solenoid 68a and between the pole pieces of core 68b, such plunger having a pair of spaced depending members 68d and 68e. A connecting member 70 has a generally horizontal U-shaped upper or common portion surrounding the depending members 68d and 68e on three sides and is secured to the latter by a bolt 70a or the like extending through alined apertures therethrough. The lower portion of member 70 is provided with a pair of depending and outwardly extending leg portions 70b and 70c, each having an upwardly threaded aperture therein. A pair of pins 72a and 72b are rigidly secured into threaded engagement in the apertures in portions 70b and 70c of connecting member 70 and depend therefrom in parallel arrangement. The lower ends of pins 72a and 72b are connected to one another by a link 72c rigidly secured to the pins by a pair of nuts or the like, there being a nut in threaded engagement with each pin on each side of link 72c. Helical compression springs 74 and 76 surround the lengths of pins 72a and 72b, respectively. A longitudinal plate 78 having a hole at each end thereof for accommodating the upper ends of pins 72a and 72b is provided between springs 74 and 76 and the outwardly extending leg portions 70b and 70c of connecting member 70. An actuator pin or projection 80 is threaded into a hole in an intermediate portion of lever 62 and extends laterally therefrom into the generally rectangular space between leg portions 70b and 70c and the common portion of connecting member 70 and plate 78.

The operation of the mechanism will now be described.

Let it be assumed that electromagnet is deenergized. As a result, the operating mechanism assumes the position shown in dotted lines in FIG. 2 provided that a tray is not passing over the diverter device including wheels 42. In this position, the left-hand end of lever 62 and roller 60 have dropped by gravity to the position shown in dotted lines and the weight of the diverter device including wheels 42 has caused cam 50 to rotate into the counterclockwise position shown in dotted lines in FIG. 2. In this position, wheels 42 are below the upper level of the adjacent conveyor rollers and no diverting action takes place when the tray passes along the main conveyor. To divert an article such as tray 6 which is approaching the diverter mechanism along the main conveyor from the latter to branch conveyor 4, electromagnet 68 is energized. As a result, the plunger moves upwardly and plate 78 engages projection 80 and rotates lever 62 in the clockwise direction. Roller 60 rolls along cam surface 50f and rotates cam 50, shaft 44 and rod 36 in the clockwise direction as seen in FIG. 2. This causes the upper portion of diverter wheels 42 to be raised above the upper level of the adjacent conveyor rollers. As a result, wheels 42 engage tray 6 and turn and divert the same onto branch conveyor 4. When the electromagnetic plunger seals, roller 60 has passed over apex 50e and has reached the discontinuity 50d in the cam surface. The restricted resilient connection between cam 50 and shaft 44 permits the weight of the tray to depress wheels 42 against the force of the torsion stress in spring 52. In this manner, diverting wheels 42 are maintained resiliently in engagement with the bottom of the tray and permit the tray also to engage the adjacent conveyor rollers whereby the tray is driven as it is being turned and diverted. In the event electromagnet 68 is deenergized while a tray is passing over wheels 42, the weight of the tray acting on wheels 42 biases cam 50 in the counterclockwise direction to maintain roller 60 in the depression of discontinuity 50d in the cam surface as shown in solid lines in FIG. 2. Thus, the diverting mechanism is maintained in its diverting position until a tray has passed over wheels 42 even if electromagnet 68 should be inadvertently deenergized.

Springs 74 and 76 provide a resilient connection between the plunger of electromagnet 68 and lever 62. Let it be assumed that the diverting mechanism is in its non-diverting position and that a tray is passing over wheels 42 when electromagnet 68 is energized. The weight of the tray on wheels 42 will prevent electromagnet 68 from pivoting lever 62 in the clockwise direction. As a result, lever 62 remains substantially in the position shown in dotted lines in FIG. 2 and cam 50 does not rotate in the clockwise direction. When the plunger moves in the upward direction, projection 80 acts to restrain plate 78 and causes springs 74 and 76 to be compressed. In this manner, the plunger is permitted to seal so that solenoid 68a will not burn out. When the tray passes over wheels 42, springs 74 and 76 act through plate 78 and projection 80 to pivot lever 62 in the clockwise direction. As a result, cam 50 is actuated to move the diverter device from its non-diverting position to its diverting position preparatory to diverting the next tray coming along the main conveyor.

While the apparatus hereinbefore described is effectively adapted to fulfill the objects stated, we do not intend to confine our invention to the particular preferred embodiment of diverter device and operating mechanism disclosed, inasmuch as it is susceptible of various modifications without departing from the scope of the appended claims.

We claim:

1. In a conveyor system having a conveyor for conveying articles therealong comprising a plurality of article supporting and conveying rollers spaced longitudinally thereof, and a diverter device mounted between a pair of rollers on the conveyor for turning and diverting articles therefrom, said diverter device being of the type having an elongated supporting rod and a row of diverting wheels mounted on said rod at a predetermined angle toward one side of the conveyor, and said supporting rod being rotatable through a predetermined angle to raise the diverting wheels from a non-diverting position below the upper level of the adjacent rollers to a diverting position above the upper level of the adjacent rollers, the improvement comprising supporting and operating means mounted on one side of the conveyor for rotating said rod, said means comprising a member having one end portion supporting and embracing one end of said rod to prevent relative rotation therebetween, a cam mounted on the other end of said member, and electro-responsive means for actuating said cam to rotate said member and said rod to raise the diverting wheels.

2. The invention defined in claim 1, wherein said rod is provided with reduced rounded end portions and the opposite sides thereof adjacent said reduced end portions being flat, and said one end portion of said supporting member is provided with an open top slot for supporting and gripping one end portion of said rod, and the other side of said conveyor is provided with an open top slot for rotatably suporting the other rounded end portion of said rod, and said slots affording ready removal and reversal of said wheel supporting rod whereby to divert articles to the other side of said conveyor.

3. The invention defined in claim 1, wherein said rod is provided with reduced rounded end portions and the opposite sides thereof adjacent said reduced end portions being partially flat, and said one end portion of said supporting member is provided with a stepped open top slot comprising a first slot portion extending partially into said member for supporting said reduced end portion of said rod and an enlarged slot portion extending all the way through the end portion of said supporting member and having vertical sides complimentary to the partially flat sides of said rod, and the other side of said conveyor having a slot for rotatably supporting the other reduced end portion of said rod, and said slots affording ready removal and reversal of said wheel supporting rod whereby to divert articles to the other side of said conveyor.

4. The invention defined in claim 1, wherein said cam comprises an elongaged cam member mounted at one end on said other end of said supporting member, said cam member having a cam surface adjacent its other end at a predetermined diverging angle relative to the primary axis thereof, an operating lever pivoted at one end and having a roller at the other end for engaging said cam surface, an electromagnet including an armature and means connecting said armature to said lever to pivot the latter and actuate said cam member when said electromagnet is energized, and actuation of said cam member causing rotation of said rod to raise said wheels to their diverting position.

5. The invention defined in claim 4, together with means journaling said cam member on said other end of its supporting member, means restricting the rotation of said cam member relative to its supporting member, and means resiliently biasing said cam member rotatably relative to its supporting member whereby said cam surface is biased against said roller and the diverting wheels are biased upwardly and the latter can be depressed against the force of said resilient means under the weight of an article to maintain the latter in driven engagement with the adjacent conveyor rollers while being diverted.

6. The invention defined in claim 4, wherein said operating lever is provided with means for adjusting said roller longitudinally thereof and relative to said cam member.

7. The invention defined in claim 4, wherein said means connecting said armature to said lever comprises a projection extending laterally from an intermediate portion of said lever, and resilient means engaging said projection and connected to said armature for normally pivoting said lever when said electromagnet is energized, and said resilient means affording complete attraction of said armature against the force of said resilient means responsive to energization of said electromagnet when said lever is immobilized by the weight of an article passing over said diverting wheels.

8. The invention defined in claim 7, wherein said resilient means comprises a connecting member having a common portion connected to said armature and having two depending leg portions, a pin depending from each such leg portion, said pins being parallel to one another, a helical spring surrounding the length of each such pin, means connecting the lower ends of said pins and serving as stops for the respective springs, and a plate having spaced apertures for accommodating said pins and being positioned between said springs and said depending leg portions of said connecting member, and said projection extending laterally from said pivotal lever into the space between said plate and said common portion and two depending leg portions of said connecting member.

9. In a conveyor system having a conveyor for conveying articles therealong comprising a plurality of article supporting and conveying rollers mounted on side rails and spaced longitudinally thereof, and a diverter device mounted between a pair of rollers on the conveyor for turning and diverting articles therefrom, said diverter device being of the type having an elongated supporting rod and a row of diverting wheels mounted by angular brackets along one side of said rod with each such wheel being at a predetermined angle toward one side of the conveyor and said supporting rod being rotatable through a small angle to raise the diverting wheels from a non-diverting position below the upper level of the adjacent rollers to a diverting position slightly above the upper level of the adjacent rollers, the improvement comprising supporting and operating means for rotating said rod, said means comprising a first open-top slot on one of said side rails for rotatably supporting one end of said rod, a vertical mounting plate mounted on the other side rail, a second open-top slot on said other said rail, an operating shaft journaled intermediate its ends in said mounting plate and extending through said second slot inwardly of said second side rail, a third open-top slot on the inwardly extending end of said operating shaft for supporting the other end of said rod, an operating arm rotatably coupled at one end thereof to the outwardly extending end portion of said operating shaft, resilient means rotatably biasing said rod relative to said operating arm to bias the diverting wheels upwardly, and electromagnetically operated means secured to said mounting plate for rotating said arm thereby to rotate said shaft and said rod and to raise said wheels into their diverting position, and said resilient means affording rotation of said shaft relative to said arm against the force thereof to allow depression of said wheels under the weight of an article to maintain such article in driven engagement with the adjacent conveyor rollers.

10. The invention defined in claim 9, wherein said outwardly extending end portion of said shaft is provided with a rounded configuration and said one end of said arm is provided with a round hole for rotatably accommodating said rounded end of said shaft, and said resilient means comprises a torsion spring having one end locked to said shaft and another end locked to said arm.

11. The invention defined in claim 10, together with a clamping member rigidly secured to the extreme outwardly extending end of said shaft for clamping said arm against said spring, and means on said arm and on said clamping member cooperating to provide a lost-motion rotary joint therebetween and to limit the rotation of said shaft relative to said arm against the force of said torsion spring to a predetermined angle.

12. The invention defined in claim 9, wherein said arm is provided with a cam surface extending from its other end along one edge thereof, and said electromagnetically-operated means comprises an electromagnet and an armature and an operating lever fixed at one end to a stationary pivot on said mounting plate and extending toward said cam surface, and a roller secured to the other end of said lever for cooperating with said cam surface to rotate said arm when said lever is pivoted by said armature thereby to raise said diverting wheels into their diverting position.

13. The invention defined in claim 12, wherein said arm is further provided with a reentrant cam surface extending further along said one edge thereof, the first mentioned cam surface and said reentrant cam surface forming an obtuse angle providing an apex at their junction over which said roller passes when said electromagnet is energized to pivot said lever to its operating position, and said apex being effective to restrain said roller and to maintain said lever in its operating position until an article has passed over the diverting wheels in the event said electromagnet is deenergized while an article is passing over said diverting wheels.

14. The invention defined in claim 12, together with resilient means connecting said lever to said armature to allow complete attraction of the latter against the force of said resilient means in the event said lever is immobilized by the weight of an article passing over said diverting wheels when said electromagnet is energized.

No references cited.